United States Patent [19]

Haneda et al.

[11] Patent Number: 4,723,260

[45] Date of Patent: Feb. 2, 1988

[54] MEDICAL X-RAY PHOTOGRAPHIC APPARATUS

[75] Inventors: Takuya Haneda, Tokyo; Yoshibumi Mukai, 2-26-16, Motokitakata, Ichikawa City, Chiba Prefecture, both of Japan

[73] Assignee: Yoshibumi Mukai, Ichikawa, Japan

[21] Appl. No.: 688,538

[22] Filed: Jan. 3, 1985

[51] Int. Cl.⁴ ............................................. H05G 1/64
[52] U.S. Cl. ...................................... 378/99; 358/111
[58] Field of Search ....................... 358/111, 166, 335; 378/99, 173; 346/35, 110; 360/35.1

[56] References Cited

U.S. PATENT DOCUMENTS

| | | | |
|---|---|---|---|
| 3,535,684 | 10/1970 | Raymond | 346/110 |
| 3,636,351 | 1/1972 | Lajus | 378/173 |
| 4,091,416 | 5/1978 | Riethmuller et al. | 358/111 |
| 4,212,072 | 7/1980 | Huelsman et al. | 358/166 |
| 4,216,499 | 8/1980 | Kunze et al. | 378/99 |
| 4,262,301 | 4/1981 | Erlichman | 358/906 |
| 4,287,521 | 9/1981 | Hakoyama | 346/35 |
| 4,334,231 | 6/1982 | Regehr | 346/35 |
| 4,386,359 | 5/1983 | Regehr et al. | 346/35 |
| 4,393,407 | 7/1983 | Yokomizo | 358/166 |
| 4,504,858 | 3/1985 | Franke | 358/111 |
| 4,511,929 | 4/1985 | Maeda et al. | 358/335 |
| 4,539,648 | 9/1985 | Schatzki | 378/70 |
| 4,551,732 | 11/1985 | Rogers | 346/110 |
| 4,560,989 | 12/1985 | Radochonski et al. | 346/110 |

FOREIGN PATENT DOCUMENTS 2320144 10/1973 Fed. Rep. of Germany ........ 378/99

Primary Examiner—Craig E. Church
Assistant Examiner—John C. Freeman
Attorney, Agent, or Firm—Laurence R. Brown

[57] ABSTRACT

An x-ray photographic apparatus for medical examination has a television camera for photographing x-ray images transmitted through an object under examination, an A/D converter for converting the output from the camera into digital form, a memory for storing the digitized data, a register connected to the memory, a television monitor that permits one to see through the object, and a cathode-ray tube connected to the register for producing light signals falling on photosensitive paper. Desired ones of the images displayed on the monitor can be copied onto the photosensitive paper.

6 Claims, 3 Drawing Figures

MEDICAL X-RAY PHOTOGRAPHIC APPARATUS

FIELD OF THE INVENTION

The present invention relates to a medical x-ray photographic apparatus and, more particularly, to a medical x-ray photographic apparatus which is capable of displaying images of an object under examination on a television monitor by passing x-rays through the object and which is also capable of selectively duplicating the displayed images.

BACKGROUND OF THE INVENTION

In medical diagnosis employing an x-ray photographic apparatus, it is necessary to obtain visible images of an affected part of a patient under examination by passing x-rays through that part at a given angle and then to record them as x-ray photographs, for checking the condition of the disease, assessing the effect of the treatment, or deciding the treatment to be adopted. For this purpose, x-ray photographs have heretofore been obtained by causing x-ray radiation to be transmitted through an affected portion of a patient under examination, permitting the resultant x-ray image to directly fall on a film, and developing it. According to another conventional method, an x-ray image that is derived by passing x-ray radiation through an affected part of a patient to be examined is focused onto an image intensifier, for example. The image produced by the intensifier is photographed with a television camera to form a corresponding visible image on a television monitor, for seeing through the affected part. Then, the dosage is changed to a value appropriate for photographing, and an x-ray photograph is taken from the image displayed on the monitor using a camera.

However, where x-ray photographs of an object under examination are directly taken from the transmitted x-rays using a film, a large quantity of dosage is needed to expose the film, increasing the amount of x-ray radiation that leaks away. Hence, the exposure dose of the patient undergoing examination is high. Also, when the apparatus is not remotely controlled, the exposure dose of the operator of the apparatus is high. When images on a television monitor are photographed by a camera as described above, the obtained photographs do not exhibit clear gradations and, therefore, it is impossible to obtain distinct photographs.

SUMMARY OF THE INVENTION

It is a general object of the present invention to provide a medical x-ray photographic apparatus which is free of the foregoing difficulties with the prior art apparatuses.

It is a more specific object of the invention to provide a medical x-ray photographic apparatus which is able to obtain clear images on a television monitor by passing a less quantity of x-ray radiation through an object under examination and which permits one to make clear copies of selected ones of the images on the monitor while watching them.

According to the present invention, x-ray radiation is directed from an x-ray generator to an affected part of a patient under inspection. The x-ray image transmitted through the patient is photographed by a television camera. The output from the camera is then converted into digital form by an analog-to-digital converter. The resulting digital data is successively stored in a memory having a storage capacity just large enough to store data of one frame. The digital data stored in the memory is read out by a first readout means, and then converted into analog form by a first digital-to-analog converter means. A television monitor operates in synchronism with the readout of data from the memory, and is supplied with the output from the first D/A converter means to display the data.

A register is provided to store an amount of the output read from the memory which corresponds to one line. Data is repeatedly read from this register by a second readout means and then converted into analog form by a second digital-to-analog converter means. Then, data of one line is supplied as a scanning light signal to photosensitive paper by a supply means. Further, a transfer means is provided to transfer data each time data of one frame is read from the memory. As data of each line is supplied to the paper, it is shifted in stepwise fashion by a shifting means to form a desired visible image, corresponding to the x-ray image transmitted through the patient, on the paper.

The above and other objects and features of the invention will appear in the course of the description thereof which follows.

DETAILED DESCRIPTION OF THE INVENTION

Figure 1:
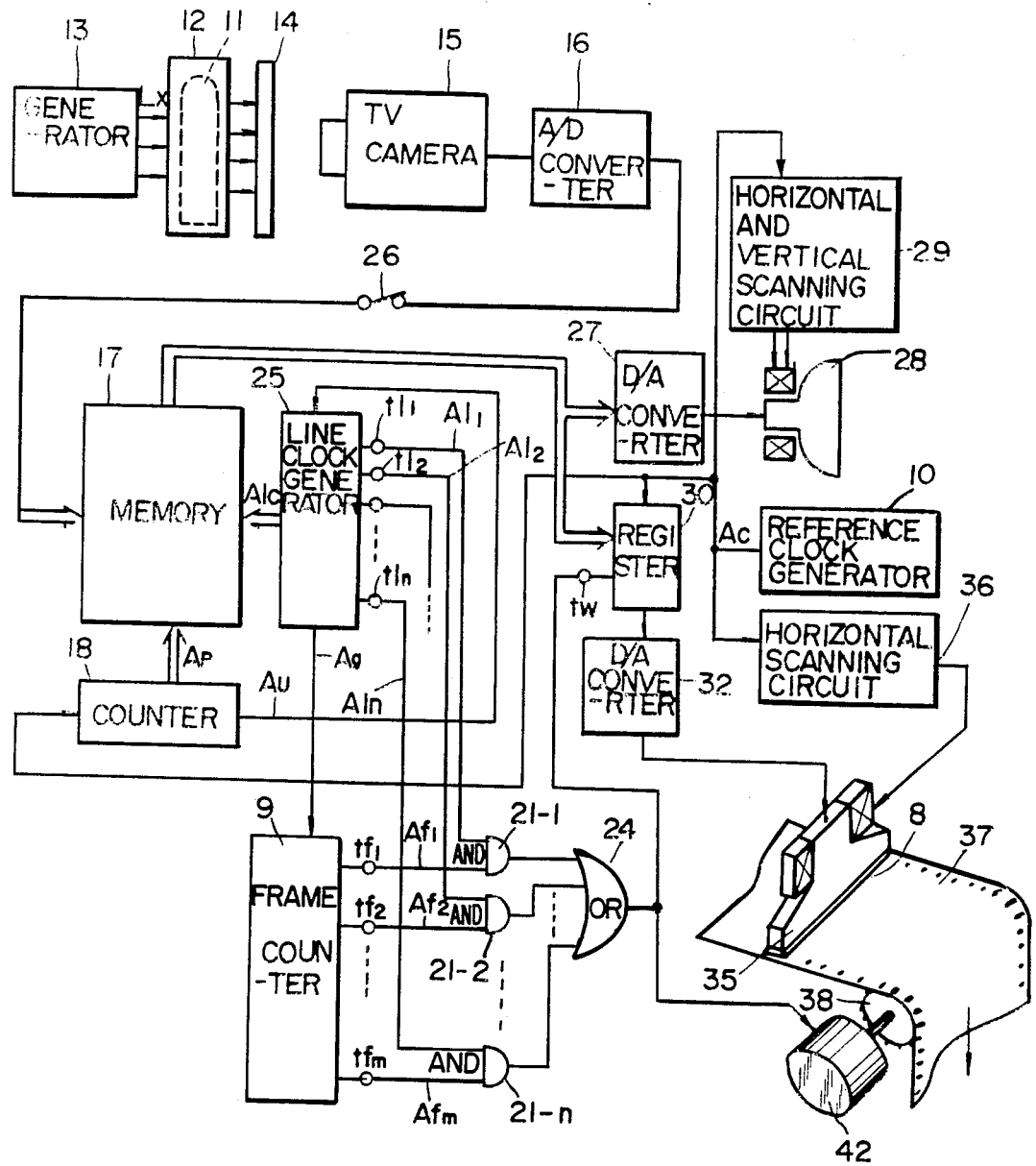
FIG. 1 is a block diagram of a medical x-ray photographic apparatus according to the present invention.

Referring to FIG. 1, there is shown a medical x-ray photographic apparatus embodying the concept of the present invention. Briefly, this apparatus consists of an x-ray generator 13 for directing x-rays to a person 11 under examination, a television camera 15 for photographing x-ray images transmitted through the person 11, an analog-to-digital converter 16 for converting the output from the camera into digital form, and a memory 17 for storing the digitized data of one frame.

Specifically, the person 11 under examination is placed on a locating table 12 and made fixed so that an object, or an affected part to be photographed, may lie within a region Lx in which the x-rays emitted by the generator 13 fall. The table 12 is capable of rotating about its center in three-dimensional manner so that the object can be moved relative to the generator 13. The angle at which the x-ray radiation emitted by the generator 13 strikes the affected part can be set to a desired value by rotating the table 12. After setting this incident angle, x-rays are produced by the generator 13 so that they penetrate through the object 11. The transmitted x-rays are focused onto an image intensifier 14.

The apparatus is so designed that, when it is set to work, all the electric circuits are reset. When the object 11 is irradiated by the x-ray generator 13, the television camera 15 begins to operate to photograph the image formed on the image intensifier 14. The resulting output signal from the camera 15 is converted into digital form by the A/D converter 16. The digital signal from the converter 16 is then applied to the memory 17 via a switch 26. The image signal of each frame which is derived from the transmitted x-ray images and which is photographed by the camera 15 is broken up into picture element signals, or pixel signals, which are then assigned their respective addresses in the memory and stored at these locations. The memory 17 can consist of a 64K-bit IC memory.

A first readout means is provided to repeatedly fetch information from the memory 17. In particular, a reference clock generator 10 produces clock pulses Ac to a pixel counter 18, which produces pixel clock pulses Ap in response to the clock pulses Ac to successively designate pixels on an identical line in the memory 17. A line clock generator 25 operates in synchronism with the operation of the counter 18, and produces at its terminal $tl_1$ a line signal $Al_1$ shown in FIG. 3(1) corresponding to the frame $Af_1$. Each time all the pixels on one line are designated by the counter 18, a carry signal Au is produced to cause the generator 25 to generate at its terminals $tl_2, tl_3, \ldots, tl_n$ line signals $Al_2-Al_n$ shown in FIGS. 3(2)-(4) corresponding to the lines one after another. Simultaneously, the memory 17 receives line clock pulses Alc from the generator 25 to instruct readout of data for each line. Since the counter 18 and the generator 25 operate repeatedly, the image data stored in the memory 17 can be read out repeatedly.

In this way, the pixel clock pulses Ap from the counter 18 and the line clock pulses Alc from the generator 25 cause x-ray image data corresponding to one frame to be read from the memory 17. The read data is applied to a digital-to-analog converter 27 which acts as a first digital-to-analog converter. The output from the first D/A converter 27 is fed to a television monitor 28 that operates in synchronism with the readout from the memory, in order to display the output on the monitor. This monitor 28 has a horizontal and vertical scanning circuit 29 which receives the clock pulses Ac from the reference clock generator 10 to put the monitor 28 in synchronism with the readout from the memory 17. Thus, the data representing the x-ray images of the object 11 is read from the memory 17 and successively displayed on the monitor 28 to form visual images corresponding to the x-ray images transmitted through the object 11.

The images displayed on the monitor 28 are watched by an operator. When he finds a desired image and depresses a memory button (not shown), the switch 26 is opened. Then, the requisite data about the transmitted x-ray image is placed in the memory 17. At the same time, a corresponding still, or motionless, image is displayed on the monitor 28.

Figure 3:
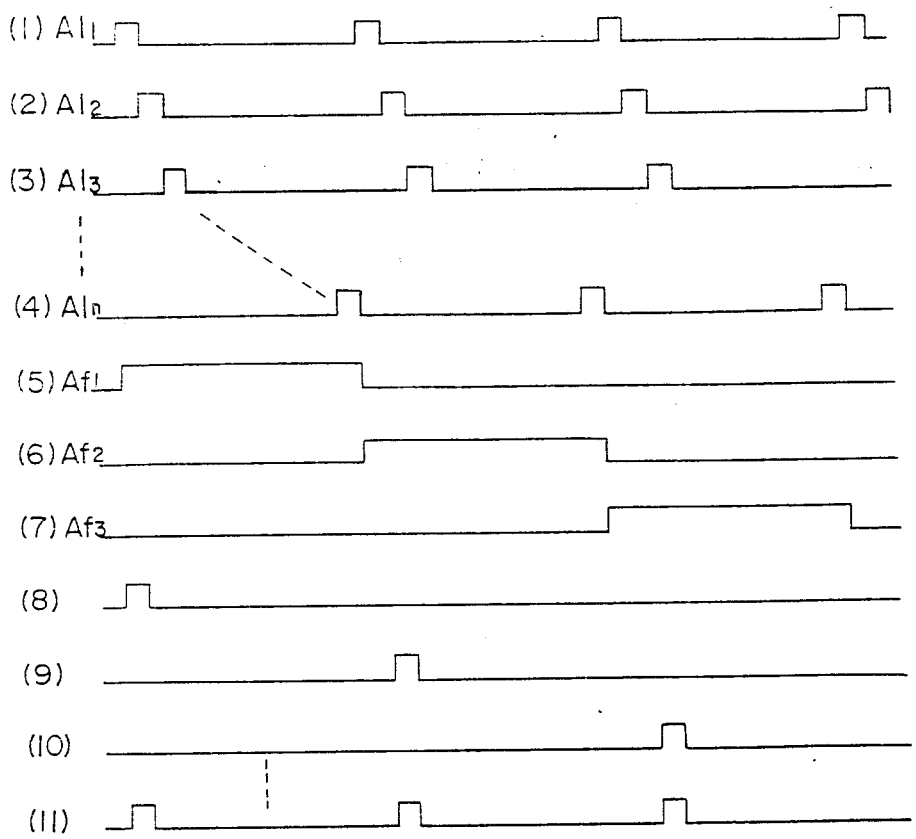
FIG. 3 is a waveform diagram showing waveforms which appear at various locations in the photographic apparatus of the invention during the operation.

Data of each line read from the memory 17 is stored in a register 30, from which data is repeatedly read out by a second readout means. Specifically, the terminals $tl_1-tl_n$ of the line clock generator 25 are connected to their respective one input terminals of AND circuits 21-1 to 21-n. A frame counter 9 has frame terminals $tf_1-tf_m$ connected with the other input terminals of the AND circuits 21-1 through 21-n. The line clock generator 25 delivers a driving signal Ag to the input terminal of the counter 9. This counter 9 further has frame terminals $tf_1$ to $tf_m$ at which frame signals $Af_1-Af_m$ appear one after another. As shown in FIGS. 3(5)-(7), these frame signals go to state 1 upon the leading edge of the line signal $Al_1$ and go to state 0 upon the trailing edge of the line signal $Al_n$ for each frame.

An OR circuit 24 has input terminals with which the output terminals of the AND circuits 21-1 through 21-n are connected. The register 30 has a write terminal $t_w$ to which the output terminal of the OR circuit 24 is connected. Data which indicates an x-ray image and is read from the memory 17 is input to the register 30 that serves to accept and store data of one line delivered from the memory 17 while the signal which is applied to the write terminal $t_w$ from the OR circuit 24 is in state 1.

The data of one line of an x-ray image which has been stored in this way is repeatedly read from the memory 30 and furnished to the second converter means, or the D/A converter 32. Each time data for one frame is retrieved from the memory 17, it is transferred to the register 30 by a transfer means. More specifically, the line signal $Al_1$ causes the x-ray image signal about the first line to be transferred to and stored in the register. During the period of one frame, the data of the one line is held in the register 30. Then, the line signal $Al_2$ brings the signal applied to the write terminal $t_w$ of the register 30 to state 1, whereupon the x-ray image data about the second line is routed to the register 30, in which it is stored. In this way, each time data about one frame is read from the memory 17, data of one line corresponding to the subsequent line is transferred to and stored in the register 30.

The digital data read out by the second readout means is converted into analog form by the second converter means. A supply means is provided to permit the output from the second converter means to be supplied as a scanning light signal to photosensitive paper. More specifically, the output terminal of the register 30 is connected with the input terminal of the D/A converter 32. Connected to the output of the converter 32 is a one-line scanning type cathode-ray tube 35 having a horizontal scanning circuit 36 to which the clock pulses Ac are applied from the reference clock generator 10 so that the tube 35 may make a horizontal scan repeatedly. Therefore, x-ray image data for one line supplied from the D/A converter 32 is converted into one scanning light signal by the cathode-ray tube 35. The obtained signal is fed via optical fibers 8, for example, to photosensitive paper 37 disposed opposite and close to the tube 35. Thus, each time one scanning light signal is produced, the paper 37 can be exposed to the light and thermally developed corresponding to the supplied data about the x-ray image.

In this case, the scanning light signals can be supplied to the paper 37 through a lens. Suppose that the number of scanning lines per frame is N and that P frames are transferred per second. Then, one scanning light signal is supplied to the paper 37 for $N \times 1/P$ second(s) for exposure and thermal development.

The photosensitive paper onto which light corresponding to data about one line is projected is moved in synchronism with the transfer operation performed by the transfer means, by means of a shifting means. More specifically, the paper 37 is disposed so as to be movable at right angles to the scanning light signals, which are produced by the cathode-ray tube 35 and travel in the direction of the lines. The paper 37 is wound on a shaft 38 at its one end side. The shaft 38 can be rotated in equal angular steps by an electric motor 42 which is stepped in equal angular increments by the output signals from the OR circuit 24.

As the data of the first line about the x-ray image which has been stored in the memory 17 is transferred to the register 30, the motor 42 is stepped in one increment. At this angular position, the data of the first line is repeatedly transferred onto the paper 37 as one scanning light signal via the cathode-ray tube 35. In this manner, the photosensitive paper is exposed to the one scanning light signal from the tube 35, corresponding to the data of the first line, and then it is thermally developed. Thus, the light information is completely copied onto the paper.

Subsequently, the data of the second line is transferred to the register 30, thereby rotating the paper 37 in one angular increment. At this angular position, the one scanning light signal corresponding to the data of the second line is emitted by the cathode-ray tube 35 and repeatedly transferred onto the paper 37 during the period of one frame. Similarly, the data about up to the n-th line is transferred onto the paper 37, and therefore the x-ray image data stored in the memory 17 is fully copied onto the paper 37. During these copying operations, the exposure and thermal development are automatically carried out. The transcription for one frame is completed for about 14 seconds, for example.

Although not shown, thermal development is performed immediately after exposure. If necessary, the paper onto which the x-ray image data has been copied may be automatically cut by a cutter and taken out.

Figure 2:
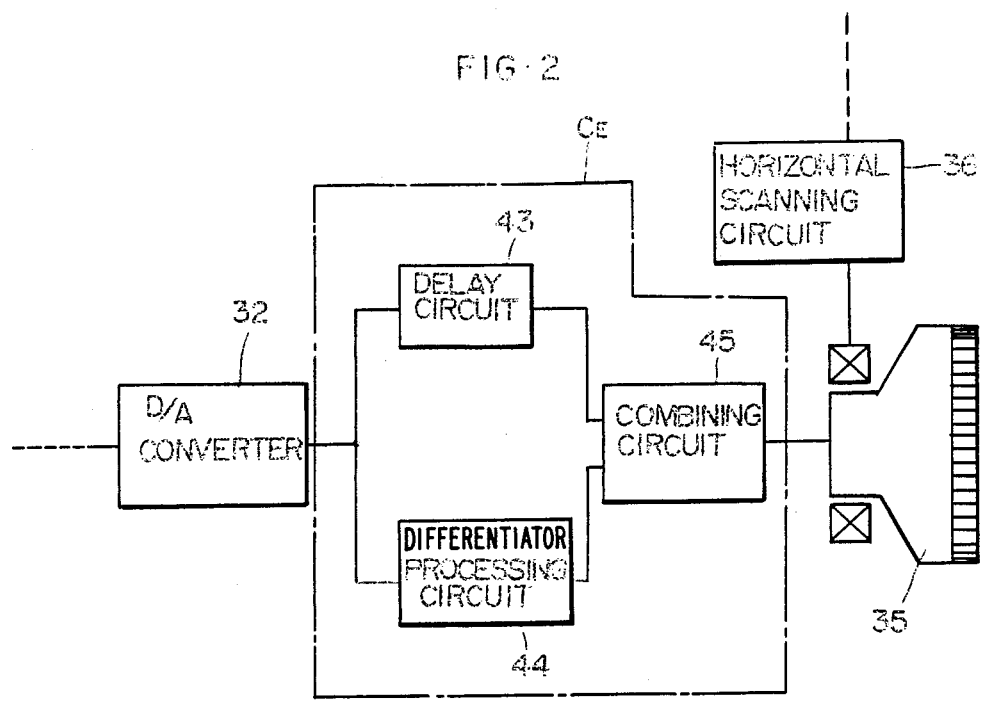
FIG. 2 is a block diagram of a contour emphasis circuit for use with another medical x-ray photographic apparatus according to the invention.

Referring next to FIG. 2, there is shown the structure and its peripheral connecting portions of a contour emphasis circuit $C_E$. This circuit $C_E$ is connected between the second digital-to-analog converter 32 and the cathode-ray tube 35 to constitute a second embodiment of the invention. In this second embodiment, the analog signal delivered by the second D/A converter 32 is applied to a delay circuit 43 and to a processing circuit 44, which differentiates its input signal under predetermined conditions to emphasize desired fringes of the signal. The output from the processing circuit 44 is combined with the original signal passed through the delay circuit 43 by a combining circuit 45. Thus, the analog signal appearing at the output terminal of the combining circuit 45 has its contour emphasized in the horizontal direction under certain conditions. Alternatively, the contour emphasis circuit $C_E$ may operate digitally to emphasize the contour digitally under certain conditions. In this case, the emphasis circuit $C_E$ is placed before the second D/A converter. It is to be understood that the novel apparatus according to the invention can be designed to carry out various image processings including coloring of a certain region of a transmitted x-ray image, as well as to emphasize the the contour by means of the emphasis circuit $C_E$.

As can be understood from the description thus far made, according to the invention, the x-ray image transmitted through the object 11 under examination can be observed through the monitor 28. During this monitoring operation, if a desired image is noticed and the switch 26 is opened, then this image can be stored in the memory 17. In this case, in order to check the image on the monitor 28 with greater reliability, data may be repeatedly read from the memory 17 while the same image is displayed on the monitor 28. In this way, only the necessary x-ray images can be selected. The obtained signal is transferred to the register 30 for every individual line. The stored data is retrieved and fed to the photosensitive paper 37 in the form of one scanning light signal for every line. A sufficient time is given to expose the paper to the successively applied light signals, and then it is thermally developed. Since the paper 37 is shifted for every line, all the lines of the transmitted x-ray image can be reproduced on the paper 37 as a vivid visual image.

According to the invention, it is possible to form a visual image on the monitor 16 using a small amount of x-ray radiation and so the exposure dose that the operator of the apparatus experiences can be greatly reduced, say, by a factor of 10 or so below the exposure dose in the case of the prior art apparatuses. It is also possible that the x-ray image data stored in the memory 17 is read out at a low speed and then transmitted via an acoustic coupler by the use of a low speed transmission line, such as a local telephone line. Accordingly, the x-ray image data stored in the memory 17 can be transferred via such a telephone line to a hospital where specialists are stationed, for close examination, or in case of absence of doctors, for tentative diagnosis.

The memory 17 may be interfaced to a host computer via a minicomputer so that the x-ray image data stored in the memory may be written to the host computer to create a file. This will enable various data processings to be carried out employing various peripheral units.

Also, a cassette magnetic tape device may be connected with the photographic device according to the invention via a magnetic tape control module. In this arrangement, the obtained, x-ray image signal is recorded on a magnetic tape. The recorded data can be directly retrieved from the tape in batches for duplication, in order to effectively process or make use of various x-ray images.

As thus far described in detail, the present invention allows the object under examination to be observed through the television monitor by passing a greatly reduced amount of x-ray radiation through the object. Desired ones of the images presented on the monitor can be selected while monitoring them. Clear copies of the selected images can be rapidly created. The x-ray image data stored in the memory can be processed to emphasize desired portions of the images. Further, x-ray image signals can be transmitted at low speeds to desired locations through the use of a telephone line, for close medical examination.

What is claimed is:

1. Photo apparatus producing high definition photocopies from short video cameras exposures for diagnosing patients by copying a selected still image of a moving object by using a stored video frame signal selected from successive frames of the moving object obtained by a TV camera in a fixed position viewing the object, comprising:

an x-ray generator for directing x-ray radiation through a patient under examination, and means for forming an image responsive to the x-ray radiation as viewed by said TV camera so that x-ray photo reproductions are reproduced with very little exposure time for the patient;

first memory means for storing line components of a video signal respectively obtained by horizontally scanning the successive frames of the moving images of the object presented by said TV camera;

display means including a TV display and means for reading out said line components of the video signal, successively at a first predetermined time interval and applying said read-out line components to said TV display for displaying said images of the object;

means for selecting the line components of one frame of the video signal stored in said first memory means to represent a still image of the object when a desired image is viewed on the TV display;

second memory means for reading out said fixed line components of the video signals frame obtained from said first memory means from stored lines of the selected frame successively at a second predetermined time interval, and storing each of the read-out line components until the next line component is read out, said second time interval corresponding to at least one frame cycle during which all of said line components stored in the first memory means are read out into said TV display;

means for copying on a recording medium a line image represented by input signals applied thereto;

means for successively reading out each of said line components of the video signal stored in said second memory means during respective said second time intervals and applying said read-out line components to said means for copying on said recording medium an image represented by the video signal composed of said applied line components; and means for advancing the recording medium for receiving the next line component to be read out responsive to synchronizing signals from the video signal for said TV display.

2. The apparatus of claim 1, wherein said copying means comprises a photosensitive paper recording medium and a cathode-ray tube receiving said line components of the video signal read out of said second memory means to convert the line components to a visible image and optical fiber means for transmitting and projecting light signals carrying the visible image to said recording medium made of photosensitive paper.

3. The apparatus of claim 1, wherein said copying means further comprises a rotatable support for advancing said recording medium, and a step motor for driving said support stepwise each time a new one of the line components is to be applied to said copying means.

4. The apparatus of claim 1, further comprising a differentiating circuit connected between said means for repeatedly reading out the line components and said copying means.

5. The apparatus of claim 4, including a delay circuit for delaying said line components received from said means for repeatedly reading out the line components, and a combining circuit for combining the outputs of said delay circuit and said differentiating circuit.

6. An apparatus comprising in combination, means for copying a selected still image of an object by using a stored video frame signal of the object selected from a succession of frames obtained by a TV camera in a fixed position viewing the object;

an x-ray generator for directing x-ray radiation through a patient under examination, and means for forming an image responsive to the x-ray radiation as viewed by said TV camera so that x-ray photo reproductions are reproduced with very little exposure time for the patient;

first memory means for storing line components of a video signal respectively obtained by horizontally scanning the successive frames of images of the object presented by said TV camera;

display means including a TV display and means for reading out said line components of the video signal, successsively at a first predetermined time interval and applying said read-out line components to said TV display for displaying said images of the object;

means for selecting the line components of one frame of the video signal stored in said first memory means to represent a still image of the object when a desired image appears on the TV display;

second memory means for reading out said fixed line components of the video signal frame obtained from said first memory means at a second predetermined time interval, and storing each of the read-out line components until the next line component is read out, said second time interval corresponding to at least one frame cycle during which all of said line components stored in the first memory means are read out;

means for copying on a recording medium a line image represented by input signals applied thereto; and means for repeatedly reading out each of said line components of the video signal stored in said second memory means during said second time intervals and applying said read-out line components to said means for copying on said recording medium an image represented by the video signal composed of said applied line components.

* * * * *